United States Patent [19]
Knutson et al.

[11] Patent Number: 5,630,440
[45] Date of Patent: May 20, 1997

[54] PIEZO COMPOSITE SHEET ACTUATED VALVE

[75] Inventors: Dale A. Knutson, Nashotah; George R. Steber, Mequon, both of Wis.

[73] Assignee: Applied Power Inc., Butler, Wis.

[21] Appl. No.: 392,016

[22] Filed: Feb. 21, 1995

[51] Int. Cl.$^6$ .................... F15B 13/044; F16K 31/02
[52] U.S. Cl. .................... 137/82; 137/554; 251/129.06
[58] Field of Search .................... 137/82, 554, 625.61, 137/625.62; 251/129.06

[56] References Cited

U.S. PATENT DOCUMENTS

| | | | |
|---|---|---|---|
| 2,596,409 | 5/1952 | Johnson et al. | 137/139 |
| 2,928,409 | 3/1960 | Johnson et al. | 137/82 |
| 3,096,269 | 7/1963 | Halbach et al. | 204/193.2 |
| 3,465,732 | 9/1969 | Kattchee | 123/32 |
| 3,524,474 | 8/1970 | McCormick | 137/625.61 |
| 3,676,722 | 7/1972 | Schafft | 310/8.6 |
| 3,753,426 | 8/1973 | Lilley | 123/139 E |
| 3,803,424 | 4/1974 | Smiley et al. | 307/149 |
| 3,927,652 | 12/1975 | O'Neill | 123/139 AT |
| 4,098,560 | 7/1978 | O'Neill | 417/214 |
| 4,195,811 | 4/1980 | Corrado et al. | 251/30 |
| 4,219,755 | 8/1980 | O'Neill et al. | 310/348 |
| 4,227,111 | 10/1980 | Cross et al. | 310/358 |
| 4,271,989 | 6/1981 | O'Neill et al. | 222/282 |
| 4,318,023 | 3/1982 | O'Neill et al. | 310/328 |
| 4,324,268 | 4/1982 | Jacobson | 137/312 |
| 4,412,148 | 10/1983 | Klicker et al. | 310/358 |
| 4,460,840 | 7/1984 | Weiger et al. | 310/328 |
| 4,466,390 | 8/1984 | Babitzka et al. | 123/90.16 |
| 4,492,360 | 1/1985 | Lee, II et al. | 251/129 |

(List continued on next page.)

FOREIGN PATENT DOCUMENTS

| | | |
|---|---|---|
| 0046431A1 | 2/1982 | European Pat. Off. . |
| 0404082A3 | 12/1990 | European Pat. Off. . |
| 0544405A1 | 6/1993 | European Pat. Off. . |
| 58-28079A | 2/1983 | Japan . |
| 4362302 | 12/1992 | Japan . |
| 2264998 | 9/1993 | United Kingdom . |
| 2280944 | 2/1995 | United Kingdom . |
| WO94/00696 | 1/1994 | WIPO . |

OTHER PUBLICATIONS

Applicant's Exhibit 1, 1 page flyer of Edo Western Corp., Salt Lake City, Utah, entitled "Piezo–Ceramic Monomorph" and identified at the bottom by EWC 01985 7512, (Undated).

Applicant's Exhibit 2, brochure entitled "EDO Corporation Acoustics Division Ceramic Operations Piezoelectric Ceramics, Material Specifications Typical Applications" of EDO Corporation Acoustics Division Ceramic Operations, Salt Lake City, Utah, (Undated).

*Primary Examiner*—Gerald A. Michalsky
*Attorney, Agent, or Firm*—Quarles & Brady

[57] ABSTRACT

A piezo-electrically actuated hydraulic valve has a nozzle type seat and a piezo-electric actuator in a plane orthogonal to the axis of the nozzle. The actuator includes a piezo-ceramic layer laminated to an electrode sheet, so that the composite is in sheet form and parallel to the plane of the seat. The electrode sheet has opposite edges which extend beyond the piezo-ceramic layer and are clamped by the housing of the valve so that the center of the actuator is positioned over the seat, and in the preferred embodiment normally closes the seat. When an electric field is applied to the piezo-ceramic layer, the actuator bows or dishes so as to displace relative to the nozzle. The electric field may be applied proportionally, in which case the actuator displaces proportionally to the field applied, the field may be applied as a pulse width modulated signal, in which case the displacement of the actuator also modulates. The actuator has an electrode coating applied over the ceramic layer, which may be divided into motor and generator sub-areas, and an area of the coating is absent where the ceramic layer seats against the nozzle. Rectangular and circular actuators are disclosed.

5 Claims, 3 Drawing Sheets

U.S. PATENT DOCUMENTS

| | | | |
|---|---|---|---|
| 4,550,744 | 11/1985 | Igashira et al. | 137/80 |
| 4,610,426 | 9/1986 | Brandner | 251/129.06 |
| 4,624,796 | 11/1986 | Giniewicz | 252/62.9 |
| 4,629,926 | 12/1986 | Siegal | 310/331 |
| 4,643,155 | 2/1987 | O'Neill | 123/506 |
| 4,688,536 | 8/1987 | Mitsuyasu et al. | 123/490 |
| 4,690,465 | 9/1987 | Takeda et al. | 303/119 |
| 4,700,971 | 10/1987 | Doi et al. | 280/707 |
| 4,705,059 | 11/1987 | Lecerf et al. | 137/625.62 X |
| 4,724,801 | 2/1988 | O'Neill | 123/90.12 |
| 4,774,976 | 10/1988 | Janecke et al. | 137/14 |
| 4,793,313 | 12/1988 | Paganon et al. | 123/506 |
| 4,862,029 | 8/1989 | Kasai et al. | 310/311 |
| 4,877,296 | 10/1989 | Leiber et al. | 303/115 |
| 4,892,328 | 1/1990 | Kurtzman et al. | 280/707 |
| 4,903,732 | 2/1990 | Allen | 251/129.06 X |
| 4,912,343 | 3/1990 | Stuart | 310/14 |
| 4,969,662 | 11/1990 | Stuart | 280/707 |
| 4,999,819 | 3/1991 | Newnham et al. | 367/157 |
| 5,021,957 | 6/1991 | Yoshino et al. | 364/426.01 |
| 5,079,472 | 1/1992 | Uhl et al. | 310/332 |
| 5,099,158 | 3/1992 | Stuart et al. | 310/14 |
| 5,100,100 | 3/1992 | Benson et al. | 251/129.06 |
| 5,135,070 | 8/1992 | Schwitalla | 180/142 |
| 5,159,225 | 10/1992 | Um | 310/328 |
| 5,162,767 | 11/1992 | Lee et al. | 335/255 |
| 5,173,673 | 12/1992 | Weigand et al. | 335/18 |
| 5,175,465 | 12/1992 | Um et al. | 310/328 |
| 5,187,398 | 2/1993 | Stuart et al. | 310/14 |
| 5,191,687 | 3/1993 | Dam et al. | 29/25.35 |
| 5,207,737 | 5/1993 | Hanley et al. | 137/85 |
| 5,222,714 | 6/1993 | Morinigo et al. | 251/129.16 |
| 5,224,510 | 7/1993 | Pericles | 137/487.5 |
| 5,237,968 | 8/1993 | Miller et al. | 123/90.11 |
| 5,267,589 | 12/1993 | Watanabe | 137/625.65 |
| 5,276,657 | 1/1994 | Newnham et al. | 367/157 |
| 5,285,995 | 2/1994 | Gonzalez et al. | 248/550 |
| 5,328,147 | 7/1994 | Stobbs | 251/30.02 |
| 5,354,032 | 10/1994 | Sims et al. | 251/129 |
| 5,374,029 | 12/1994 | Bailey | 251/129.16 |
| 5,452,878 | 9/1995 | Gravesen et al. | 251/129.02 |
| 5,470,045 | 11/1995 | Kazama et al. | 251/129.15 | ic
PIEZO COMPOSITE SHEET ACTUATED VALVE

BACKGROUND OF THE INVENTION

1. Field of the Invention

This invention relates to hydraulic or pneumatic valves having piezo-electric actuators, and in particular to such valves having a piezo-electric actuator in the form of a thin sheet made up of a piezo lamina and an electrode lamina in which edges of the sheet are constrained against axial motion by the valve housing and which bows or cups in the middle when electrically excited.

2. Discussion of the Prior Art

Piezo-electric materials are well known and have been used in a variety of applications. A material possesses piezo-electric properties if it produces an electric charge when it is subjected to a mechanical stress. When so subjected, a piezo-electric material exhibits what is known as the "generator effect". Conversely, when an electric field is applied to a piezo-electric material, a mechanical stress is induced in the material which causes it to deflect. This phenomenon is referred to as the "motor effect".

Some piezo-electric materials are naturally occurring crystalline materials such as quartz and tourmaline. Artificially produced piezo-electric crystals include rochelle salt, ammonium, dihydrogen phosphate (ADP) and lithium sulphate. Piezo-electric materials also include polarized piezo-electric ceramics. Piezo-electric ceramics include lead zirconate titanate, barium titanate, lead titanate and lead metaniobate.

Various processes are involved in the production of piezo-electric ceramics. Typically, the production process includes mixing the raw materials, heating the powders so as to react the constituents into a compound (known as "calcining") and grinding the calcined powders. Various shapes may then be formed of the powders using a binder to hold the shapes together prior to firing. A number of firing steps may then occur to burn off the binders and provide mechanical strength, and at higher temperatures to chemically bond the material together. Electrodes are then applied to the desired surface or surfaces of the piezo-electric ceramic part. The electrode may take the form of a layer of electrically conductive material such as silver oxide which is chemically deposited on the surface of the piezo-electric ceramic in a coating process, or maybe an electrically conductive sheet such as invar, copper, nickel, brass or silver which is laminated to the surface of the piezo-electric ceramic.

The piezo-electric properties are activated in the manufacturing process when the part with the electrodes applied is subjected to a high electric field so as to align the dipoles within the ceramic material. Aging of the ceramic then occurs in which the dipoles relax and eventually reach a steady state. Depolarization of the piezo-electric ceramic can result from excessive heat, electrical or mechanical stress or combinations of these conditions.

Piezo-electric ceramics have found usage in many different applications. For example, piezo-electric ceramics are used in sonar and specialized transducers, in fish finders, in ultrasonic applications such as cleaners and other cavitation products, in high sensitivity hydrophones and other receiving devices, in accelerometers, and in electro-acoustic devices.

Piezo-electric ceramics have also been applied to actuate hydraulic and pneumatic valves. In known valve actuators, thin sections of piezo-ceramic material have been stacked between multiple electrodes so as to produce a column of alternating layers of piezo material and electrode material. Individual voltages are then applied to the electrodes so that each layer of piezo-ceramic material changes slightly in thickness, but when all the changes in thickness add up due to the mechanical relationship of the piezo ceramic layers to one another, the total deflection of the column is sufficient to modulate the opening and closing of a hydraulic valve. While the force output is high and the displacement can be made sufficient, these types of actuators are bulky and expensive due to the volume of piezo ceramic material required.

In another application of piezo ceramic material to actuate hydraulic valve, sometimes referred to as a "piezo bender", a strip of piezo ceramic material with an electrode laminated to one side is cantilevered at one end and at the opposite end overlies the seat of the hydraulic valve. The strip can be caused to bend toward or away from the seat, depending upon the magnitude and polarity of the voltage applied across the piezo ceramic material. A variation on this is laminating two oppositely poled piezo strips to one another, rather than one piezo strip to a metal electrode. Relatively large displacements (for example 0.010") can be obtained, but the force output and the stiffness of the strips are very low.

Thin sheets of piezo-electric ceramics laminated to an electrode sheet are known. When a layer of piezo-electric ceramic is laminated to only one side of the electrode sheet, the composite is known as a monomorph. When the electrode has a layer of piezo-electric ceramic material laminated on both of its sides, the resulting laminate is known as a bimorph. When excited with an electric field and constrained along opposite edges, a monomorph or bimorph deflects into a bowed shape if it is relatively long and wide or a cupped shape if it is both long and wide.

The amount of deflection of a monomorph or bimorph depends upon the voltage applied, within limits. When the voltage is oscillated, the monomorph or bimorph also oscillates, and can be oscillated at a relatively high frequency, for example $300_{hz}$. Perhaps the most common application of monomorphs and bimorphs has been in acoustic devices, in which the monomorph or bimorph has been oscillated to produce a sound, much like the cone of a conventional speaker is oscillated to produce sounds.

Solenoid operated valves in which an armature is opened or closed against a nozzle type valve seat are also known, for example from U.S. Pat. Nos. 4,774,976 and 5,328,147. The solenoids associated with operating these valves are relatively heavy, large and expensive. In addition, the mass of the armatures and the coil inductance limit the frequency at which they can be oscillated, for example if the solenoid is energized with a pulse width modulated electrical signal. The limitation of the frequency can cause the resulting pressure to be uneven, displaying pressure dither, and also limits the control pressure band width.

SUMMARY OF THE INVENTION

The invention provides a hydraulic or pneumatic valve which addresses the above disadvantages of prior solenoid and piezo-electrically actuated valves. As in the prior art, a valve of the invention has a housing, an inlet port in the housing, an outlet port in the housing, and a nozzle type valve seat having an axis, an interior and an exterior, the interior being in communication with one of the ports and the exterior being in communication with the other of the ports, and with the seat lying in a first plane which is orthogonal to an axis of the seat. A piezo-electric valve actuator is provided adjacent to the seat for varying an opening between the actuator and the seat for flow between the exterior and interior of the seat. However, in a valve of the invention, the actuator is in the shape of a sheet and is mounted in the housing generally parallel to the seat at opposite edges of the actuator so that the housing constrains the edges against movement in the direction of the axis of the seat. As such, when the actuator is electrically excited, it bows or cups relative to the seat, to vary the opening of the valve. This configuration provides a relatively small and low cost piezo-electric actuator in which the actuation forces and displacements obtainable are adequate to control relatively high pressure differentials and flow rates. In addition, since the actuator has a fast frequency response, the pressure dither can be reduced by using a higher frequency pulse width modulated signal to control the valve, and the controlled pressure bandwidth is increased for any given frequency, as compared to a solenoid operated valve.

DETAILED DESCRIPTION OF THE PREFERRED EMBODIMENTS

Figure 1:
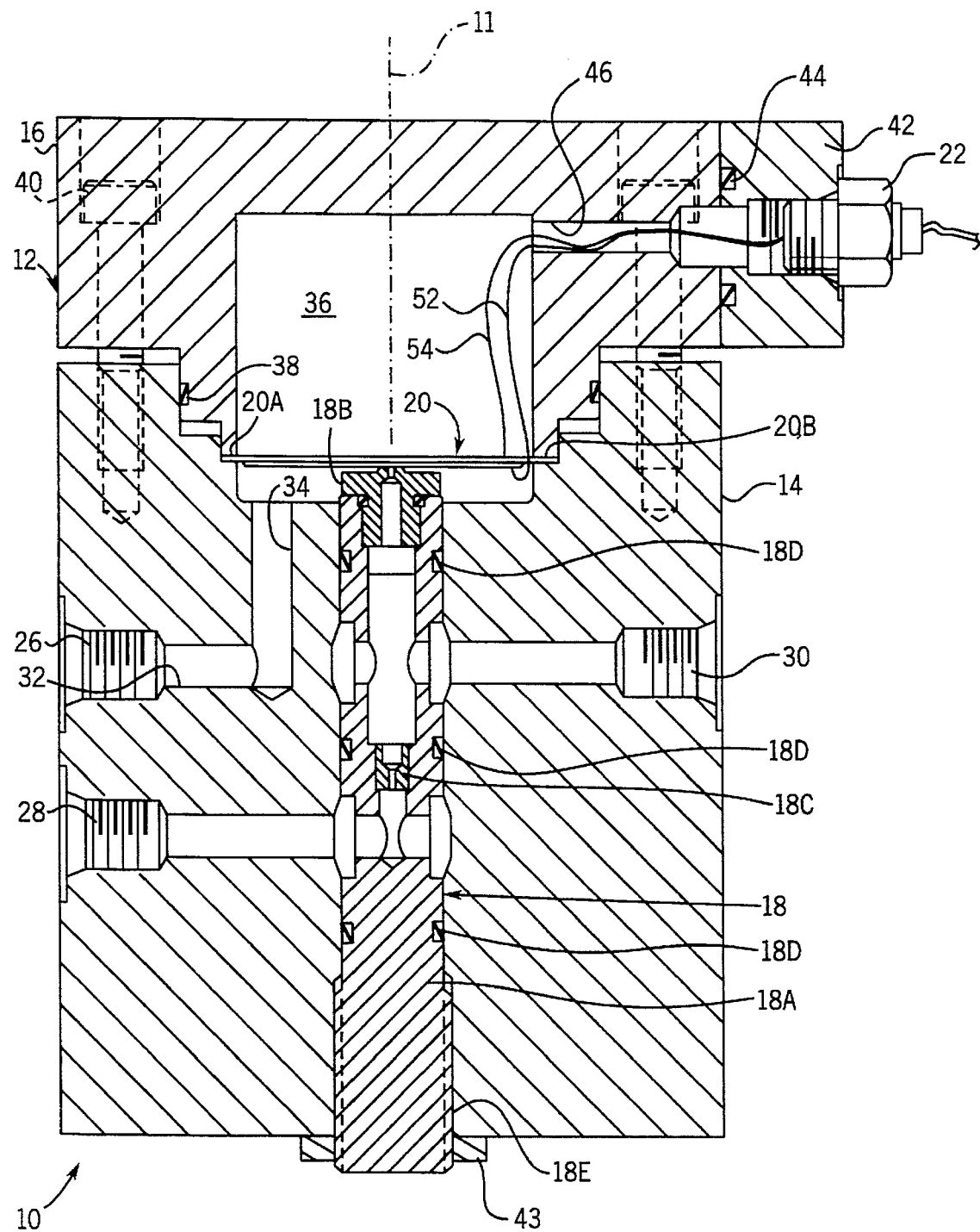
FIG. 1 is a cross-sectional view of a piezo-electrically actuated hydraulic valve incorporating the invention.

Referring to FIG. 1, a piezo-electrically actuated valve 10 of the invention includes a valve housing 12 which is made up of body 14 and cap 16. The valve 10 also includes insert 18 and piezo-electric actuator 20.

The body 14 defines an inlet port 26, a relatively low pressure tank port 28 and a control pressure port 30. The inlet port 26 is for receiving a pressurized flow of hydraulic oil from a suitable source (not shown) such as a pump, and communicating it through passages 32 and 34 to the chamber 36 in which the actuator 20 resides.

The ends 20A and 20B of the actuator 20 are clamped between the cap 16 and the body 14. An O-ring 38 seals the cap 16 to the body 14 and bolts 40 secure the cap 16 to the body 14. Electrical connector 22 is secured to a block 42 which is secured by appropriate fasteners (not shown) to the cap 16 and sealed thereto by an O-ring 44. Electrical wires 52 and 54 run from the chamber 36 to the connector 22 via passageway 46.

Insert 18 includes tube 18A, nozzle type valve seat 18B screwed into the upper end of tube 18A, and orifice 18C which is screwed into approximately the middle section of tube 18A. Tube 18A and body 14 define passages from nozzle 18B to control port 30 and, downstream of control port 30, the lumen of tube 18A leads to orifice 18C. Tube 18A and body 14 also define passages from orifice 18C to tank port 28. Tube 18A is sealed to body 14 between chamber 36 and port 30, between ports 30 and 28, and between port 28 and the lower end of tube 18A by o-rings 18D.

The orifice 18C is sized so as to create a restriction to the flow of hydraulic or gas fluid through it so that the pressure created between nozzle 18B and orifice 18C can be controlled either by varying the degree to which the nozzle 18B is opened or the duration that it is opened. A solenoid operated valve which operates on this principal is described in U.S. Pat. No. 4,774,976, the disclosure of which is hereby incorporated by reference. However, it should be understood that the invention could be applied to opening and closing a nozzle in any of a variety of valving arrangements, including those described in U.S. Pat. No. 5,328,147, which is hereby incorporated by reference, and those described in U.S. patent application Ser. No. 08/391,972, now abandoned, entitled "Piezo-Electrically Actuated Valve" and U.S. patent application Ser. No. 08/391,887, entitled "Magnetically Assisted Piezo-Electric Valve Actuator", both filed on the same day as this application and commonly assigned to Applied Power Inc., the disclosures of which are also hereby incorporated by reference.

The actuator 20 is a piezo-ceramic monomorph, which as illustrated includes an electrode sheet 48 which is laminated on one of its sides to a layer 50, which is a sheet of piezo-ceramic material. An electrically conductive coating 51, such as silver oxide, is applied to the surface of sheet 50 which is opposite from electrode 48 and a lead wire 52 is soldered so as to establish electrical contact with the conductive coating electrode 51. A second lead wire 54 is soldered to the surface of electrode 48 which is opposite from piezo-ceramic sheet 50 so as to establish electrical contact with the electrode sheet An electrical potential is applied between the wires 52 and 54 so as to excite the piezo-ceramic sheet 50, via the electrical field created between the coated electrode 51 and the sheet electrode 48.

Figure 3A:
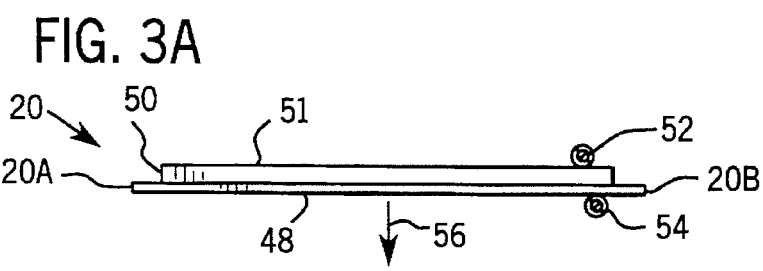
FIG. 3A is a side plan view of the piezo-electric actuator of FIG. 2.

The piezo-ceramic sheet 50 is poled, preferably in the thickness direction, so that when it is excited with an electric field, the actuator 20 bows or cups in the direction indicated by arrow 56 in FIG. 3A. Such monomorphs are available from EDO Corporation, Acoustics Division, of Salt Lake City, Utah. In one embodiment which has been tested with satisfactory results, the electrode sheet 48 was made of invar metal and had dimensions of 2' by 1" by approximately 0.008" thick. The piezo-ceramic sheet was EDO Corporation's EC-98 ceramic, which is a lead magnesium niobate composition, and had dimensions of 1.75" by 1" by 0.020" thick. Since the actuator 20 is assembled in the housing 12 with the piezo-ceramic sheet side facing the nozzle 18B, a small area (for example 0.19' diameter) 58 of the coated electrode 51 is removed at the center of the actuator 20 and the nozzle 18B contacts the actuator 20 within this area. At least the electrode coating 51 must be removed in the area 58 or else, since the electrode 51 is positively charged when the actuator 20 is excited, an electrical short would be created between the electrode coating 51 and the nozzle 18B. Alternatively, since the electrode sheet 48 is grounded, as is the nozzle 18B, the electrode coating 51 and the piezo-ceramic sheet 50 may be removed in the area 58 and the electrode sheet 48 allowed to contact and seal against the nozzle 18B.

Figure 2:
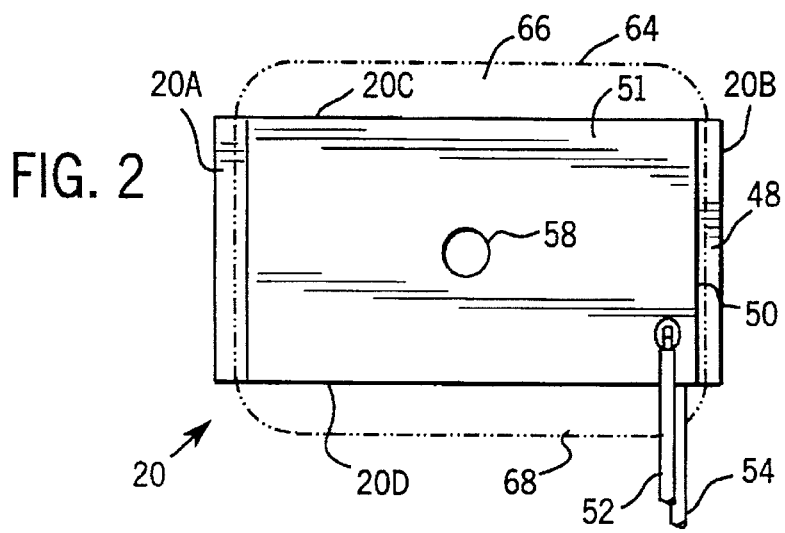
FIG. 2 is a bottom (relative to the orientation of FIG. 1) plan view of a piezo-electric actuator for the valve of FIG. 1.

The actuator 20 is clamped by the housing 12 along its end edges 20A and 20B, which are the end edges of the electrode sheet 48. The dotted line 64 in FIG. 2 identifies the shape defined by the sidewalls of the chamber 36 relative to the actuator 20 and there it can be seen that a space 66 and 68 exists between the respective side edges 20C and 20D of the actuator 20 and the sidewalls 64 of the chamber 36. The spaces 66 and 68 allow hydraulic fluid entering the chamber 36 from the inlet port 26 to flow around the side edges 20C and 20D of the actuator 20 to the far side (or electrode sheet 48 side) of the actuator 20.

Since the pressure inside of the chamber 36 exterior of the nozzle 18B is the same everywhere within the chamber 36 (when the nozzle 18B is closed, i.e., under no flow conditions), and is higher than the pressure inside of the nozzle 18B, there is a net hydraulic force on the actuator 20 which biases it toward the nozzle 18B. This force can be estimated from the following equation:

$$F = A_1(P_1 - P_2)$$

where F is the force, $A_1$ is the cross-sectional area of the nozzle 18B, $P_1$ is the pressure in the chamber 36 and $P_2$ is the pressure interior of the nozzle 18B.

Although the actuator 20 is quite brittle due to the brittleness of the piezo-ceramic sheet 50, it does have some flexibility contributed by the electrode sheet 48 and its mounting in the housing 12. The end 18E of the insert 18 may be threaded into the body 14 as shown in FIG. 1 so as to adjust the axial position of the nozzle 18B toward or away from the actuator 20. A locknut 43 is provided with which to secure the adjustment. It is noted that in production of a valve of the invention, other means such as shims, a friction fit, or the type of adjustment described in U.S. Pat. No. 4,774,976 may be provided so that the axial position of the nozzle 18B relative to the actuator 20 could be adjusted if necessary so as to provide optimum results in relation to the actuator 20. Alternatively, no adjustment may be necessary, depending on manufacturing tolerances and the application to which the valve is to be applied.

In the preferred embodiment, insert 18 is adjusted to produce a null condition at relatively low pressure, for example, 20 psig, in the chamber 36. Thus, a pressure of 20 psig is applied to the chamber 36 and the nozzle 18B is adjusted toward the actuator 20 until flow at the control port 30 just stops. However, in normal operation, the pressure in chamber 36 may be much higher, for example 200 psig.

The actuator 20 may be excited by a pulse width modulated electrical signal or by a proportional voltage signal. The voltages required are relatively high. In the actuator described, at a voltage of 500 volts the center displacement (at axis 11 of nozzle 18B) is approximately 0.010 inches. Although high voltages are required, the actuator 20 draws current only during the period of time in which it is moving. Thus, the average current draw is less than that of a solenoid for the same duty cycle since the piezo-electric actuator motion occurs in less than 0.001 seconds. Since actuator 20 has a fast response, a relatively high frequency can be used for the pulse width modulated signal. Using a relatively high frequency for modulating the actuator 20 (relative to the frequency which can be used with a solenoid operated valve) is desirable because it results in smoothing of the resulting pressure signal at the control port 30, i.e. the resulting pressure signal has less "dither" at the higher frequencies. Also, for a given pulse width modulated signal frequency, the pressure control band increases with faster valve actuation.

Figure 3B:
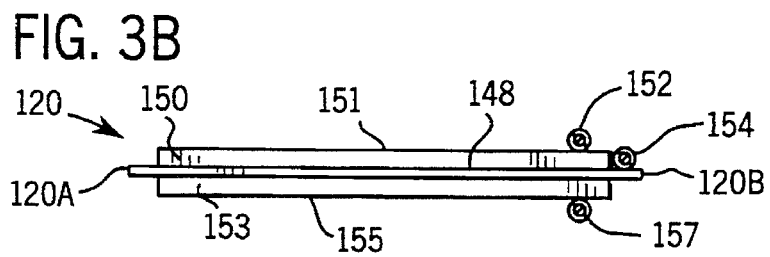
FIG. 3B is a side plan view of a second embodiment of a piezo-electric actuator for a valve of the invention.

While FIG. 3A illustrates an actuator 20 which is a monomorph, meaning that the electrode sheet 48 has only one side laminated to a piezo-ceramic sheet 50, FIG. 3B illustrates an alternate embodiment of an actuator 20 which is a bimorph, in which electrode sheet 148 has each of its sides laminated to a separate piezo-ceramic sheet 150 and 153. The actuator 120 is largely the same as the actuator 20, and the same reference numerals are applied to the actuator 120 as were applied to the actuator 20 for corresponding elements, plus 100.

In the actuator 120, an electrode coating 151 is applied to the outer surface of sheet 150 and an electrode coating 155 is applied to the outer surface of sheet 153. Lead wire 152 is soldered so as to establish electrical contact with coating 151 and lead wire 157 is soldered so as to establish electrical contact with coating 155. Since the bimorph actuator 120 has ceramic sheets on both sides of the electrode sheet, a greater displacement would be possible for a given voltage if electrical potentials were applied to both ceramic sheets so that they worked together (with appropriate poling) to simultaneously cause the actuator to bow in the same direction. Alternatively, an electrical potential could be applied to one of the ceramic sheets to cause the actuator to bow in one direction and an electrical potential could be applied to the other ceramic sheet to cause the actuator to bow in the other direction. The nozzle could then be adjusted relative to the actuator to produce an intermediate pressure at port 30 so that energizing one of the ceramic sheets would increase the pressure at port 30 and energizing the other sheet would reduce it. It may also be possible to accomplish this with a monomorph by simply reversing the polarity of the electrical field.

Figure 3C:
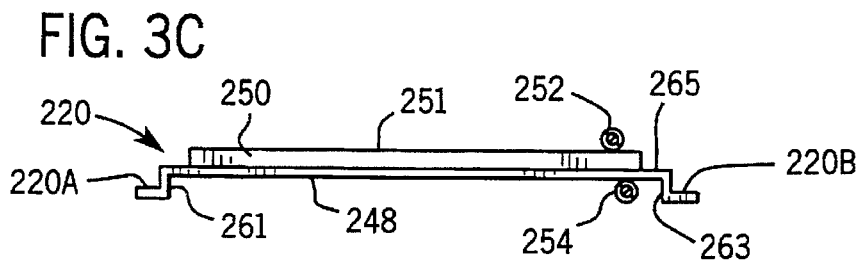
FIG. 3C is a side plan view of a third embodiment of a piezo-electric actuator for a valve of the invention.

FIG. 3C illustrates a third alternate embodiment 220 which is essentially the same as the actuator 20, and corresponding reference numerals have been applied, plus 200. The only difference between the actuator 220 and the actuator 20 is that the electrode 248 is extended and bent at its ends so as to define legs 261 and 263 which extend axially (relative to the axis 11 of the nozzle 18B) and edges 220A and 220B, which are clamped between the body 14 and cap 16, are provided at the ends of legs 261 and 263 which are opposite from the main portion 265 of the electrode 248. As shown, the edges 220A and 220B extend perpendicularly from the legs 261 and 263 and in a plane which is generally parallel to the plane of the main portion 265 and of the piezo-ceramic sheet 250. This configuration provides for additional flexure of the electrode sheet 248 so that greater displacements may be achieved for a given voltage.

Figure 4:
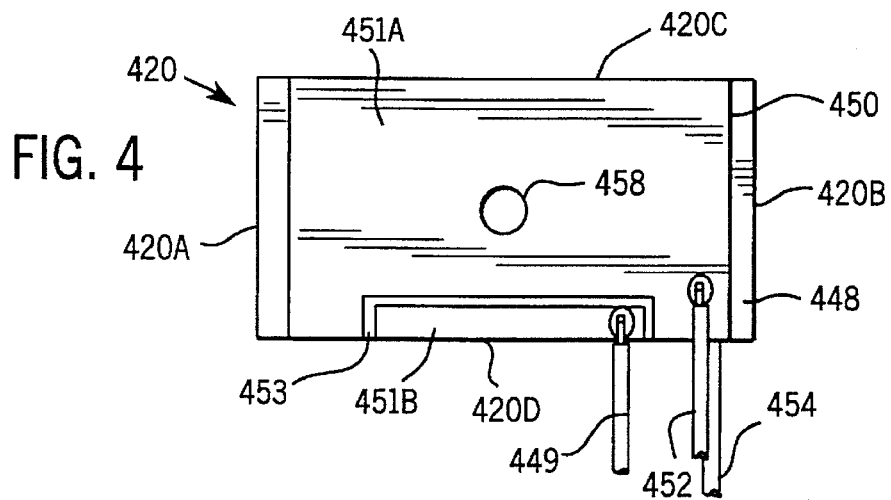
FIG. 4 is a bottom plan view of a fourth embodiment of a piezo-electric actuator for a valve of the invention.
Figure 5:
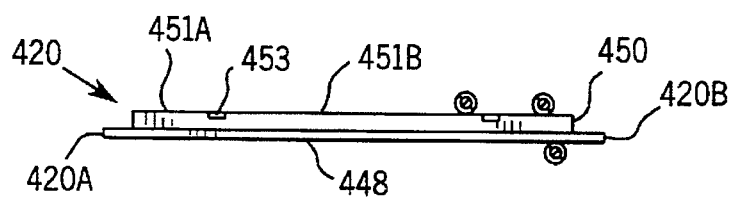
FIG. 5 is a side plan view of the piezo-electric actuator of FIG. 4.

FIGS. 4 and 5 illustrate another embodiment 420 of a monomorph piezo-ceramic actuator for a hydraulic valve of the invention. Reference numerals have been applied to the embodiment 420 corresponding to the reference numerals of the actuator 20, plus 400. The actuator 420 is the same as the actuator 20 except that the electrode coating has been divided into two sub-areas 451A and 451B by perimetral zone 453 in which the coating is etched away or masked in the coating process so that in the actuator 420 the coating is absent in this zone. In addition, a third lead wire 449 is soldered so as to provide an electrical connection with the electrode coated sub-area 451B.

As in the actuator 20, a positive voltage is applied to coating sub-area 451A via lead 452 and electrode sheet 448 is grounded via lead 454. Coating sub-area 451B, which is provided to act as a generator, does not electrically communicate with coating sub-area 451A. When a voltage is applied between leads 452 and 454, a voltage is generated between sub-area 451A and sheet 448 and the actuator 420 deflects, which induces a mechanical stress in the ceramic sub-area 451B so that it generates its own potential.

Accordingly, lead 449 is provided as an output lead to monitor the voltage of sub-area 451B as an indication of the displacement of the actuator 420.

Figure 6:
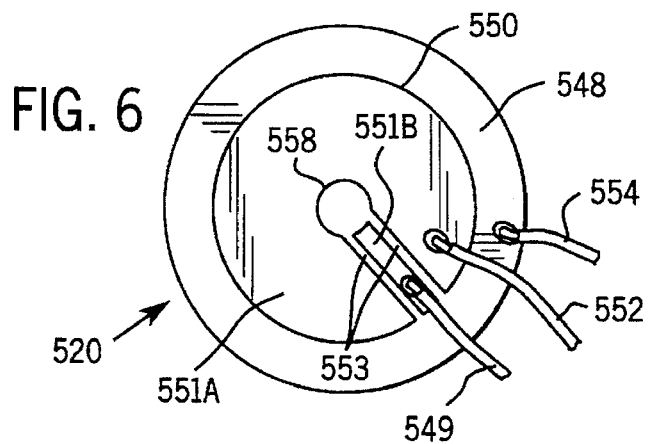
FIG. 6 is a bottom plan view of a fifth embodiment of a piezo-electric actuator of the invention.
Figure 7:
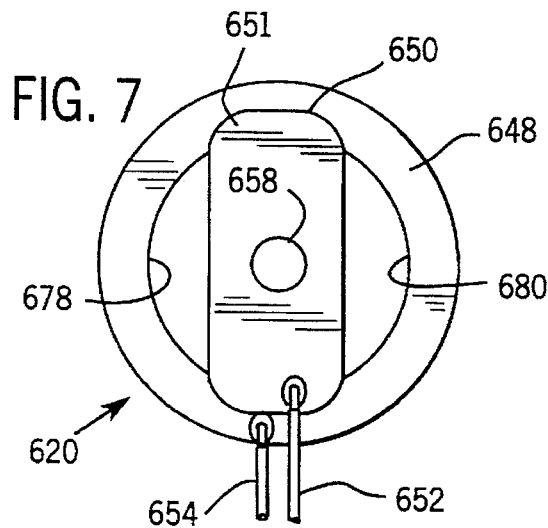
FIG. 7 is a bottom plan view of a sixth embodiment of a piezo-electric actuator of the invention.
Figure 8:
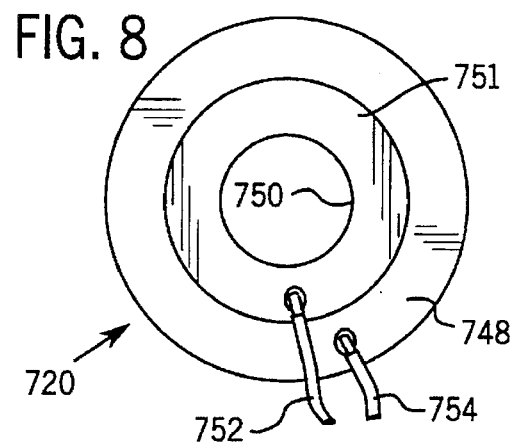
FIG. 8 ms a bottom plan view of a seventh embodiment of a piezo-electric actuator of the invention.

A piezo-ceramic actuator for a valve of the invention need not be rectangular in shape. To illustrate that, FIGS. 6–8 show three embodiments of actuators 520, 620 and 720 having a circular peripheral shape. In the actuators 520, 620 and 720, reference numerals of the various elements have been applied corresponding to the reference numerals of the elements applied in the actuator 20, plus 500, 600, and 700, respectively.

The actuator 520 of FIG. 6, in the form of a thin disc, is most similar to the actuator 420 of FIGS. 4 and 5, since the electrode coating on the ceramic layer 550 is divided into motor sub-area 551A and generator sub-area 551B by zones 553 in which the electrode coating is absent. The zones 553 intersect nozzle contact area 558 in which the electrode coating is also absent.

The actuator 620 roughly approximates a rectangular actuator in which a circumferential rim of the electrode sheet 648 extends around the ceramic covered part of the electrode, which bridges the rim. Thus, in the actuator 620, half moon shaped openings 678 and 680 are formed in the electrode sheet 648 and the piezo-ceramic sheet 50 is laminated to the center bridging portion of the electrode 48, which is between the openings 678 and 680. An advantage of the embodiment 620 is that the openings 678 and 680 allow hydraulic fluid to flow freely from one side of the actuator 20 to the other, whereas in the embodiments 520 and 720, if the edges of the electrode sheets 548 and 748 are clamped around all or substantially all of the periphery of the actuator, a separate passage must be provided in the housing to permit oil to flow from one side of the actuator to the other. However, it should be noted that in the embodiments 520, 620 and 720, it is not necessary to clamp them in the housing around their entire periphery, although that is one possible mounting arrangement, but that it is preferred to clamp them at at least two diametrically opposite points on their periphery to restrain those points against axial motion.

In the actuator 720, electrode sheet 748 is a disc (as is the electrode sheet 548) and the piezo-ceramic sheet 750 is an annular sheet, shaped somewhat like a washer. The electrode coating 751 is applied over the exposed surface of the ceramic annulus 751. It is not necessary to mask or etch an area similar to the area 558 in the actuator 720, since the nozzle 18B can make direct contact with the electrode sheet at the center of the disk 748, since the nozzle and the electrode sheet are at the same electrical potential.

The invention provides a piezo-electrically actuated hydraulic valve in which the actuator is smaller, lighter and less expensive than prior solenoid operated or piezo-operated actuators. A valve of the invention has a piezo-electrically operated actuator with a fast frequency response, which may be used to control relatively high pressures over a relatively wider pressure control band and with a lower pressure dither amplitude.

Embodiments of the invention have been described in considerable detail. Modifications and variations of the embodiments described will be apparent to persons skilled in the art. Therefore, the invention should not be limited to the embodiments described, but should be defined by the claims which follow.

We claim:

1. In a hydraulic valve of the type having a housing, an inlet port in the housing, an outlet port in the housing, and a valve seat having an axis, an interior and an exterior, the interior being in communication with one of the ports and the exterior being in communication with the other of the ports, and with the seat lying in a plane which is orthogonal to an axis of the seat, and a piezo-electric valve actuator for varying a flow area between the exterior and the interior of the seat, wherein the seat is formed on an end surface of a nozzle, the actuator is in the shape of a sheet having opposed planar surfaces, at least one of the surfaces facing and being generally parallel and adjacent to the plane of said seat and the actuator is mounted in the housing at opposite edges of the actuator so that the housing constrains the edges against movement in the direction of the axis of the seat, the one surface of the actuator and the seat defining between them the flow area, and the actuator is a piezo-electric monomorph comprising a layer of piezo-electric material and an electrode sheet laminated to the piezo-electric layer, the improvement wherein:

said layer of piezo-electric material is on only one side of said actuator and said electrode sheet is on an opposite side, and said one side faces said seat; and said electrode sheet extends beyond said layer of piezo-electric material at ends thereof and defines at each said end a leg portion which extends generally perpendicularly from said electrode sheet and an edge portion which extends generally perpendicularly from said leg portion, said edge portions being restrained in said housing.

2. In a hydraulic valve of the type having a housing, an inlet port in the housing, an outlet port in the housing, and a valve seat having an axis, an interior and an exterior, the interior being in communication with one of the ports and the exterior being in communication with the other of the ports, and with the seat lying in a plane which is orthogonal to an axis of the seat, and a piezo-electric valve actuator for varying a flow area between the exterior and the interior of the seat, wherein the seat is formed on an end surface of a nozzle, the actuator is in the shape of a sheet having opposed planar surfaces, at least one of the surfaces facing and being generally parallel and adjacent to the plane of said seat and the actuator is mounted in the housing at opposite edges of the actuator so that the housing constrains the edges against movement in the direction of the axis of the seat, the one surface of the actuator and the seat defining between them the flow area, and the actuator is a piezo-electric monomorph comprising a layer of piezo-electric material and all electrode sheet laminated to the piezo-electric layer, the improvement wherein:

said layer of piezo-electric material is on only one side of said actuator and said electrode sheet is on an opposite side, and said one side faces said seat; and said piezo-electric layer has two sub-areas, electrode surfaces of said sub-areas opposite from said electrode sheet being electrically isolated from one another such that applying an electric field to one of said areas to deflect said actuator results in an electrical output from the other sub-area.

3. In a hydraulic valve of the type having a housing, an inlet port in the housing, an outlet port in the housing, and a valve seat having an axis, an interior and an exterior, the interior being in communication with one of the ports and the exterior being in communication with the other of the ports, and with the seat lying in a plane which is orthogonal to an axis of the seat, and a piezo-electric valve actuator for varying a flow area between the exterior and the interior of the seat, wherein said seat is formed on an end surface of a nozzle, said actuator is in the shape of a sheet having opposed planar surfaces, at least one of said surfaces facing and being generally parallel and adjacent to said plane of said seat, and said actuator is mounted in said housing at opposite edges of said actuator so that said housing constrains said edges against movement in the direction of said axis of said seat, said one surface of said actuator and said seat defining between them said flow area, and wherein said actuator includes an electrode sheet laminated to a piezo-electric sheet, said electrode sheet extending beyond said piezo-electric sheet at ends thereof, the improvement wherein:

said electrode sheet defines at each said end a leg portion which extends generally perpendicularly from said electrode sheet and an edge portion which extends generally perpendicularly from said leg portion, said edge portions being restrained in said housing.

4. In a hydraulic valve of the type having a housing, an inlet port in the housing, an outlet port in the housing, and a valve seat having an axis, an interior and an exterior, the interior being in communication with one of the ports and the exterior being in communication with the other of the ports, and with the seat lying in a plane which is orthogonal to an axis of the seat, and having a piezo-electric valve actuator for varying a flow area between the exterior and the interior of the seat, wherein said seat is formed on an end surface of a nozzle, said actuator is in the shape of a sheet having opposed planar surfaces, at least one of said surfaces facing and being generally parallel and adjacent to said plane of said seat and wherein said actuator is mounted in said housing at opposite edges of said actuator so that said housing constrains said edges against movement in the direction of said axis of said seat, said one surface of said actuator and said seat defining between them said flow area, said actuator including an electrode sheet laminated to a piezo-electric sheet, the improvement wherein:

said piezo-electric sheet has two sub-areas, electrode surfaces of said sub-areas opposite from said electrode sheet are electrically isolated from one another such that applying a voltage across one of said sub-areas to deflect said actuator results in an electrical output from the other sub-area.

5. The improvement of claim 4, wherein an electrode layer is absent from a surface of said piezo-electric sheet in a zone which divides said piezo-electric sheet into said sub-areas.

* * * * *